United States Patent [19]

Tsatskin

[11] Patent Number: 5,785,113
[45] Date of Patent: Jul. 28, 1998

[54] COOLING SYSTEM FOR OPTICAL PORT

[76] Inventor: Leonid Tsatskin, 8016 17th Ave. (Apt. 3F), Brooklyn, N.Y. 11214

[21] Appl. No.: 642,952

[22] Filed: May 6, 1996

[51] Int. Cl.⁶ .......................... F28F 27/00; G05D 23/12; G05D 23/02
[52] U.S. Cl. .......................... 165/41; 165/287; 165/299; 432/237; 244/117 A; 244/129.3
[58] Field of Search .................. 165/287, 299, 165/41, 44; 244/121, 129.3, 117 A; 432/237; 236/100

[56] References Cited

U.S. PATENT DOCUMENTS

| | | | |
|---|---|---|---|
| 1,114,246 | 10/1914 | Furber | 236/100 |
| 2,233,650 | 3/1941 | Swartz | 432/237 |
| 3,192,575 | 7/1965 | Rosenau, Jr. et al. | 244/129.3 |
| 3,452,553 | 7/1969 | Dershin et al. | 244/117 A |
| 4,932,608 | 6/1990 | Heidish et al. | 244/129.3 |
| 5,014,932 | 5/1991 | Driftmyer | 244/129.3 |
| 5,257,757 | 11/1993 | Paul et al. | 244/117 A |
| 5,305,973 | 4/1994 | Shortland et al. | 244/117 A |

FOREIGN PATENT DOCUMENTS 1122883  11/1984  U.S.S.R. .................. 432/237

*Primary Examiner*—John K. Ford
*Attorney, Agent, or Firm*—Charles E. Baxley, Esq.

[57] ABSTRACT

A system for eliminating distortion of optical ports during supersonic flight includes an electrohydraulic pump which is controlled by a potentiometer actuated by expansion and contraction of a gas that acts on a piston which is mounted in a cylinder. The cylinder is mounted in thermal contact with a frame which supports one or more layers of optical glass. The electrohydraulic pump operates to pump cooling fluid into the frame thereby cooling the frame and the optical glass when the gas expands as a result of heating during supersonic flight.

8 Claims, 2 Drawing Sheets

COOLING SYSTEM FOR OPTICAL PORT

BACKGROUND OF INVENTION

The present invention relates generally to the field of aerial photography and more particularly to a cooling system for an optical port.

Supersonic aircraft typically incorporate optical ports for aerial photography. These ports incorporate one or more layers of optical glass mounted in a frame attached to a fuselage of the aircraft. During supersonic flight, there is heating of an outer skin of a fuselage and consequently heating and distortion of the frame and the optical glass. This heating causes distortion of the optical glass and a loss of quality in photographs taken therethrough. The heating problem is pronounced in pilotless aircraft which operate at extreme speeds, resulting in a high degree of heating and, consequently, substantial thermal distortion of the optical glass.

OBJECTS AND SUMMARY OF THE INVENTION

It is an object of the present invention to provide a cooling system for an optical port which is capable of preventing overheating of an aircraft optical port during supersonic flight.

Another object of the present invention is to provide a cooling system for an optical port which prevents thermal distortion of the optical port.

Another object of the present invention is to provide a cooling system for an optical port which is capable of high quality photography during supersonic flight.

Yet another object of the present invention is to provide a cooling system for an optical port which comprises a small number of simple component parts resulting in long term reliable operation.

The foregoing and other objects and advantages of the present invention will appear more clearly hereinafter.

In accordance with the present invention there is provided a cooling system for an optical port for supersonic aircraft which comprises a frame connected to the aircraft's fuselage and which supports a plurality of layers of optical glass.

An electro-hydraulic system includes an electro-hydraulic pump connected to a reservoir and to the frame via hydraulic lines. Operation of the pump is controlled by a potentiometer which is connected to a thermal sensing element. The thermal sensing element includes a piston which operates in a cylinder mounted in the frame and is at the same temperature as the frame. The space under the piston is filled with gas such as FREON® -12, which has a co-efficient of expansion that is linearly proportional to changes of temperature. When the frame is heated, the FREON® -12 gas expands and actuates the potentiometer to operate the electrohydraulic pump to deliver a suitable rate of flow of cooling hydraulic fluid to the frame. As the optical glass gets hotter, the FREON® -12 gas expands, moving the potentiometer to increase the operation of the pump, thereby increasing the cooling of the glass.

The cooling system provides increased cooling flow during periods of increased heating of the glass, thereby maintaining acceptable temperature of the glass and preventing thermal distortion.

BRIEF DESCRIPTION OF THE DRAWINGS

Other important objects and advantages of the present invention will be apparent from the following detailed description of the invention, taken in conjunction with accompanying drawings in which.

DETAILED DESCRIPTION OF THE INVENTION

Figure 1:
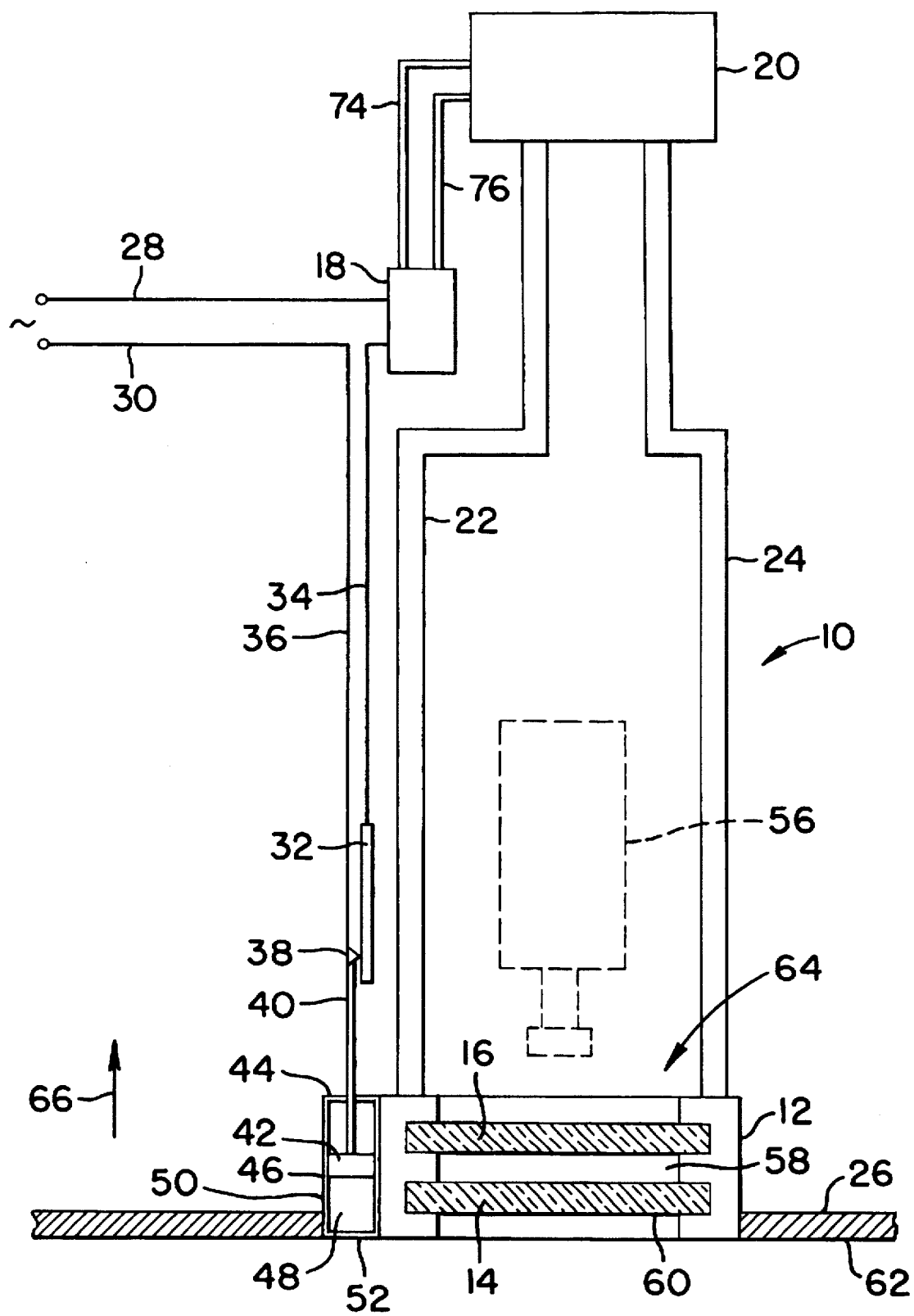
FIG. 1 is a cross-sectional view of a cooling system for an optical port, made in accordance with the present invention, with the cooling system shown in schematic form.

With reference to the drawings, wherein like reference numbers designate like or corresponding parts throughout, there is shown in FIG. 1 a cooling system for an optical port 10, made in accordance with the present invention, which includes a frame 12 which supports a plurality of plates or layers of optical glass 14, 16, an electro-hydraulic pump 18, a reservoir 20 and hydraulic lines 22, 24 which connect the reservoir 20 and frame 12. The frame 12 is connected to the fuselage 26 of an aircraft by conventional fasteners, such as bolts or screws, which are not shown. The electro-hydraulic pump 18 is connected in flow communication to reservoir 20 via hydraulic lines 74, 76. The electro-hydraulic pump 18 is connected to a source of electrical power via electrical lines 28, 30 and to a potentiometer 32 via electrical lines 34, 36.

Potentiometer 32 has a movable contact 38 which is connected via a rod 40 to a piston 42 of a thermosensing element 44.

Figure 2:
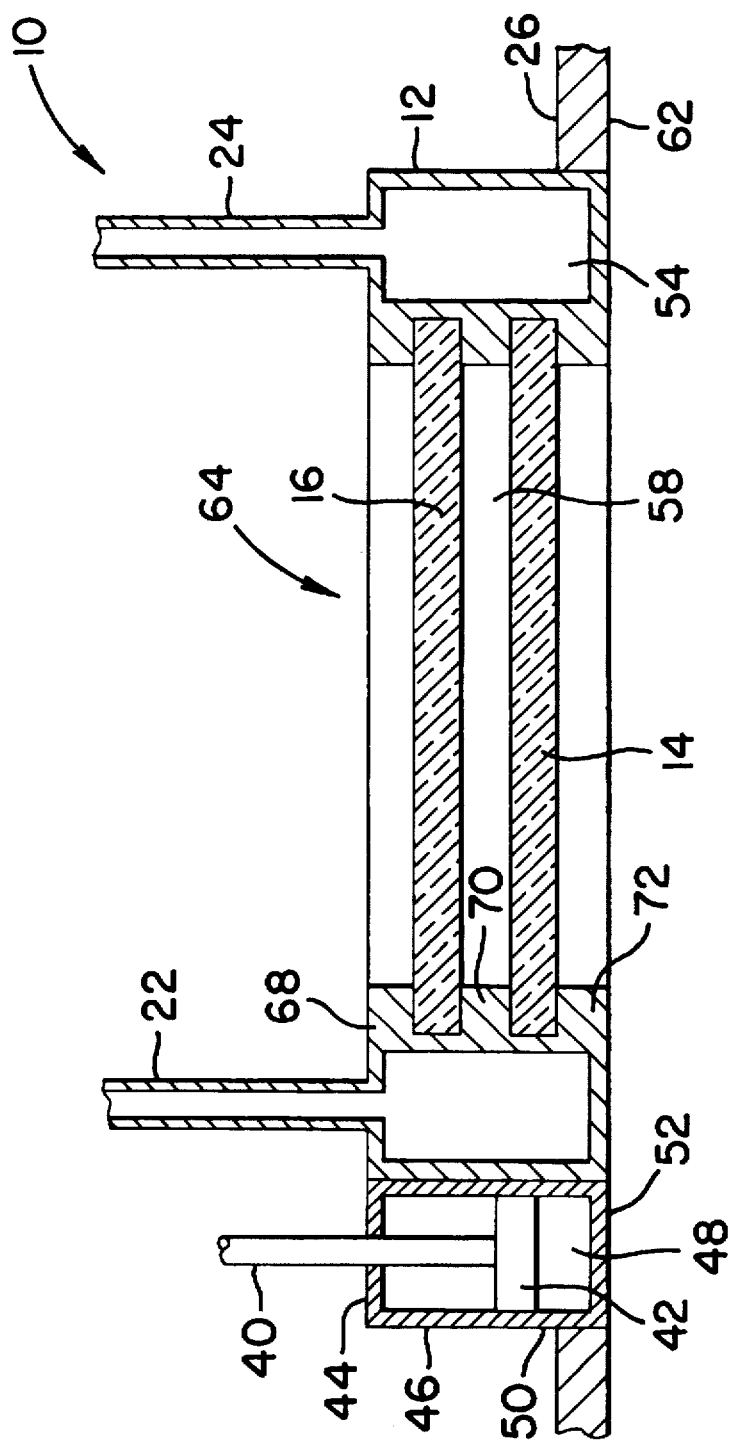
FIG. 2 is a cross-sectional view of the frame portion of the optical cooling system of FIG. 1. drawn to a larger scale.

The thermosensing element 44, which forms a key feature of the present invention, includes a cylinder 46 which is attached to the frame 12, as is shown in FIGS. 1 and 2 and thus the thermosensing element 44 is at the same temperature as the frame 12 and the optical glass 14, 16. The piston 42 is slideably mounted in cylinder 46. A space 48 under the piston 42 is filled with gas which has a co-efficient of expansion which is proportional to changes in temperature and creates a generally linear volume to temperature relationship.

A preferred gas for this application has been found to be FREON® -12 (dichlorodifluoromethane), having the formula $CCl_2F_2$, molecular weight 120.91, registry number 75-71-8.

A preferred composition of the optical glass is: Aluminosilicate glass, glass code 1720, color-clear, form BT Class I, service temperature 490 degree Centigrade, preferred thickness in the order of 3.2 mm.

The layers of optical glass 14, 16 are supported by projecting portions 68, 70, 72 which are integrally formed in the frame 12 as is shown in FIG. 2.

The cross-sectional shape of the frame 12 preferably has the general configuration of a capital letter "E". The layers of optical glass 14, 16 may be circular or, alternatively, rectangular in shape when viewed in plan view.

Relatively thin walls 50, 52 of the cylinder 46 allow the gas in the space 48 below the piston 42 to expand or contract in accordance with heating or cooling of the fuselage 26 and the frame 12.

By way of example, a space 58 between the optical glass layers 14, 16 is typically in the order of 2 to 2.5 mm and a surface 60 of the optical glass layer 14 is typically recessed approximately 3 mm below outer surface 62 of fuselage 26. These dimensions are by way of example only and do not constitute limitations on the present invention.

During operation, the temperature of the optical glass 14, 16, the frame 12 and the gas interspace 48 are initially the same. When the temperature of the frame 12 increases, for example, due to supersonic aircraft speed, the temperature of the gas in the space 48 is similarly raised. The gas in the space 48 expands, thereby moving the piston 42 and the potentiometer 32 in the direction shown by an arrow 66 in FIG. 1, changing resistance of the potentiometer 32 and causing the electro-hydraulic pump 18 to turn on or to increase its pumping action and pump hydraulic fluid into the cavity 54 of the frame 12 to cool the frame 12 and the optical glass 14, 16.

The glass layers 14, 16 form an optical port 64 and the system 10 according to the present invention is used typically with a camera 56 which is shown in broken lines 56 in FIG. 1 for aerial photography. Cooling of the frame 12 and the optical glasses 14, 16 prevents thermal distortion of the optical glasses 14, 16 and improves clarity and accuracy of photographs taken by the camera 56.

The foregoing specific embodiments of the present invention as set forth in the specification herein are for illustrative purposes only. Various deviations and modifications may be made within a spirit and scope of this invention, without departing from a clearly discernable theme thereof.

I claim:

1. A cooling system for an optical port comprising at least one layer of optical glass in a frame means which includes:

connection means for connecting said frame means to an aircraft fuselage, support means for supporting said layer of optical glass, and cavity means arranged in heat transfer relationship with said layer of optical glass;

the cooling system comprising in combination:

pump means;

reservoir means for storage of cooling fluid;

fluid connection means connecting said pump means in flow communication with said reservoir means and said frame means for circulation of said cooling fluid through said cavity means responsive to operation of said pump means;

thermal sensing means in thermal contact with said frame means for sensing temperature of said frame means and said optical glass layer, with said thermal sensing means comprising:

cylinder means, mounted in thermal contact with said frame means, with said cylinder means filled with gas, piston means slideably mounted in said cylinder means, potentiometer means, mechanical connection means connecting said potentiometer means and said piston means, electrical connection means connecting said potentiometer means and said pump means, whereby thermal expansion and contraction of said gas in said cylinder means causes motion of said piston means and actuation of said potentiometer means and thereby controls said pump means for control of the cooling fluid flow through said cavity means of said frame means.

2. The cooling system for an optical port as claimed in claim 1, wherein said frame means comprises support means for supporting a plurality of layers of optical glass.

3. The cooling system for an optical port as claimed in claim 1, wherein said optical glass is alumino-silicate glass.

4. The cooling system for an optical port as claimed in claim 1, wherein said gas is dichlorodifluoromethane.

5. The cooling system for an optical port as claimed in claim 1, wherein said frame means has a cross-sectional shape generally corresponding to the capital letter E.

6. The cooling system for an optical port as claimed in claim 1, wherein said pump means comprises electrohydraulic pump means.

7. The cooling system for an optical port as claimed in claim 1, wherein said cooling fluid comprises hydraulic fluid.

8. The cooling system for an optical port as claimed in claim 1, further comprising a plurality of spaced apart layers of the optical glass with the cavity means therebetween.

* * * * *